US008169693B1

(12) United States Patent
Ward

(10) Patent No.: US 8,169,693 B1
(45) Date of Patent: May 1, 2012

(54) FIBER BUNDLE PHASE CONJUGATE MIRROR

(75) Inventor: Benjamin G. Ward, Colorado Springs, CO (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 430 days.

(21) Appl. No.: 12/540,399

(22) Filed: Aug. 13, 2009

(51) Int. Cl.
*G02F 1/29* (2006.01)
*G02F 1/35* (2006.01)
*G02B 6/04* (2006.01)

(52) U.S. Cl. .............. 359/341.3; 359/300; 359/349; 385/115; 385/126

(58) Field of Classification Search ............. 359/300, 359/341.1, 341.3, 349; 385/115, 126
See application file for complete search history.

(56) References Cited

U.S. PATENT DOCUMENTS

| 4,529,273 | A | | 7/1985 | Cronin-Golomb et al. | |
|---|---|---|---|---|---|
| 4,762,397 | A | * | 8/1988 | Pepper | 349/17 |
| 4,767,195 | A | * | 8/1988 | Pepper | 359/276 |
| 4,794,345 | A | | 12/1988 | Linford et al. | |
| 5,038,359 | A | | 8/1991 | Pepper et al. | |
| 5,059,917 | A | | 10/1991 | Stephens | |
| 5,557,431 | A | * | 9/1996 | Pepper | 359/10 |
| 5,880,873 | A | | 3/1999 | Danie et al. | |
| 6,385,228 | B1 | | 5/2002 | Dane et al. | |
| 6,480,327 | B1 | | 11/2002 | Betin | |
| 2003/0062464 | A1 | * | 4/2003 | Byren et al. | 250/201.9 |
| 2006/0045444 | A1 | * | 3/2006 | Miller et al. | 385/115 |
| 2006/0257083 | A1 | * | 11/2006 | Rasmussen | 385/115 |
| 2007/0003196 | A1 | * | 1/2007 | Holcomb et al. | 385/115 |
| 2007/0217740 | A1 | * | 9/2007 | Brosnan et al. | 385/33 |

OTHER PUBLICATIONS

J.E. Rothenberg, "Passive Coherent Phasing of Fiber Laser Arrays", Proc. of SPIE, 2008, pp. 687315-1 to 687315-9, vol. 6873.

* cited by examiner

*Primary Examiner* — Eric Bolda
(74) *Attorney, Agent, or Firm* — AFMCLO/JAZ

(57) ABSTRACT

An improved method and apparatus for passively conjugating the phases of a distorted wavefronts resulting from optical phase mismatch between elements of a fiber laser array are disclosed. A method for passively conjugating a distorted wavefront comprises the steps of: multiplexing a plurality of probe fibers and a bundle pump fiber in a fiber bundle array; passing the multiplexed output from the fiber bundle array through a collimating lens and into one portion of a non-linear medium; passing the output from a pump collection fiber through a focusing lens and into another portion of the non-linear medium so that the output from the pump collection fiber mixes with the multiplexed output from the fiber bundle; adjusting one or more degrees of freedom of one or more of the fiber bundle array, the collimating lens, the focusing lens, the non-linear medium, or the pump collection fiber to produce a standing wave in the non-linear medium.

23 Claims, 4 Drawing Sheets

FIBER BUNDLE PHASE CONJUGATE MIRROR

Research leading to this invention was funded by the High Energy Laser Joint Technology Office under the Multidisciplinary Research Program "High Power Eye Safer Fiber Laser Arrays" at the United States Air Force Academy. It may be manufactured and used by or for the Government of the United States for all governmental purposes without the payment of any royalty.

BACKGROUND OF THE INVENTION

This disclosure relates to phase conjugation of distorted wavefronts. In particular, it relates to phase conjugation of distorted wavefronts that result from optical phase mismatch between elements of a fiber laser array. If the wavefronts of beams in a fiber laser array cannot be conjugated, the resulting distortion, sometimes referred to as "piston" error, prevents a uniform wavefront from being achieved at the output of the laser. This reduces power output from the laser, and may cause the laser to shut down.

Recent research has explored different ways to combine multiple fiber lasers or amplifiers to achieve power scaling while maintaining near diffraction limited performance. This research has taken several approaches. These approaches include both coherent and spectral combining.

Passive coherent phasing of laser arrays offers a simpler approach but has met with only limited success. Current passive coherently-combined fiber laser schemes are limited to a coherent brightness gain of approximately 8-12 for large arrays. Some further improvements such as an intensity dependent index (Kerr) nonlinearity have shown modest expected maximum improvement, with coherent brightness gain saturating at 10-14, depending on the strength of the nonlinearity.

This phenomenon has been confirmed theoretically and experimentally. Schemes employing stimulated Brillouin scattering phase conjugate mirrors have been proposed, however, they require a master oscillator as well as a Faraday rotator medium, which cause system engineering difficulties.

Thus, there remains a need for a method and apparatus that provide improved phase conjugation of distorted wavefronts to yield improved coherent brightness gains that facilitate utilization of such output in directed energy and similar applications. In particular, improvements in passive phase conjugation of distorted wavefronts are needed.

SUMMARY OF THE INVENTION

This disclosure represents a major improvement in the phase conjugation of distorted wavefronts that result from optical phase mismatch between elements of a fiber laser array. The disclosed methods and apparatuses provide a way to combine separate laser beams into a single phase locked beam. They also potentially enable power scaling of passively coherently combined directed energy weapons based on these arrays.

This disclosure overcomes a key technical obstacle of how to multiplex pump waves that are essential to the non-linear optical process and responsible for the wavefront correction together with the beams creating the wavefront. It does so through employment of a novel fused fiber bundle geometry. This improved method and apparatus will potentially result in significant savings in the cost and weight of currently proposed systems for military and other applications, and offer other improvements in key areas such as precision engagement.

This disclosure also provides a method and apparatus that compensate for phase differences in the signal of each element of an array of fiber-optic sources. This phase difference is sometimes also referred to as "piston" error. When the fiber elements of the array are spatially combined in a close-packed fiber bundle to fill an aperture, such piston error can result in a combined wavefront that is non-uniform. Such non-uniform wavefronts result in poor spatial coherence. However, if these wavefront are then conjugated, or reversed, the return signal in each fiber array element will be injected in phase at that location by the phase conjugation or reversal. As a result, the return signal in each fiber array element will be in phase at the opposite end of the fiber array elements where laser output occurs.

The disclosed methods and apparatuses accomplish this conjugation through a four-wave mixing in a suitable non-linear material or medium within which the combined output of the fiber bundle array is focused. The four-wave mixing process requires that two counter-propagating pump beams be focused into the non-linear medium so that their combined intensity is uniform in the region of overlap with the fiber bundle array output.

This mixing process can be accomplished by feeding a pump signal through a central element of the fiber bundle array. This central element or bundle pump fiber has a core that is smaller in diameter than the cores of the other fibers in the fiber bundle array. Uniformity in the overlap region in the non-linear medium is accomplished through the bundle pump fiber having a smaller diameter core than the cores of the other signal fibers in the fiber bundle array. The smaller core of the bundle pump fiber causes the pump beam to spread out more rapidly as it propagates and thereby encompass the combined beam emanating from the other fibers in the fiber bundle array. Another pump beam is delivered by another pump fiber that is identical to the central fiber of the bundle. This pump collection fiber outputs a counter-propagating beam to the non-linear medium. The disclosed method and configuration facilitate perfect or near-perfect mode-matching of the counter-propagating beams by enabling a counter propagating pump in each delivery fiber to be maximized, thereby leading to maximum four-wave mixing and thus greatly improved phase conjugation efficiency.

A method for passively conjugating a distorted wavefront comprises the steps of: multiplexing a plurality of probe fibers and a bundle pump fiber in a fiber bundle array; passing the multiplexed output from the fiber bundle array through a collimating lens and into one portion of a non-linear medium; passing the output from a pump collection fiber through a focusing lens and into another portion of the non-linear medium so that the output from the pump collection fiber mixes with the multiplexed output from the fiber bundle; adjusting one or more degrees of freedom of one or more of the fiber bundle array, the collimating lens, the focusing lens, the non-linear medium, or the pump collection fiber to produce a standing wave in the non-linear medium.

An apparatus for passively conjugating the phases of a fiber bundle array, comprises: a fiber bundle array that includes a plurality of probe fibers and a bundle pump fiber; a collimating lens disposed substantially adjacent to the fiber bundle array; a non-linear medium disposed adjacent to the collimating lens; a focusing lens disposed adjacent to the non-linear medium; and a pump collection fiber disposed substantially adjacent to the pump collection fiber, wherein one or more degrees of freedom of said fiber bundle array, said collimating lens, said focusing lens, and said pump collection fiber can be adjusted so that beams emitted from said probe fibers and said bundle pump fiber pass through said collimating lens and said non-linear medium and engage a beam emitted from said pump collection fiber to produce a standing wave in said non-linear medium.

DETAILED DESCRIPTION

According to a preferred embodiment, a pump fiber is disposed at the center of a fiber bundle array. Such fiber bundle arrays may be fabricated by introducing the fibers into a fused-silica capillary tube which is then drawn down in a tapering machine which is available commercially. The pump fiber core has a generally smaller aperture or tighter focal spot than the apertures of the other fibers in the bundle. The smaller core of the pump fiber makes the pump fiber beam expand more rapidly.

Figure 1:
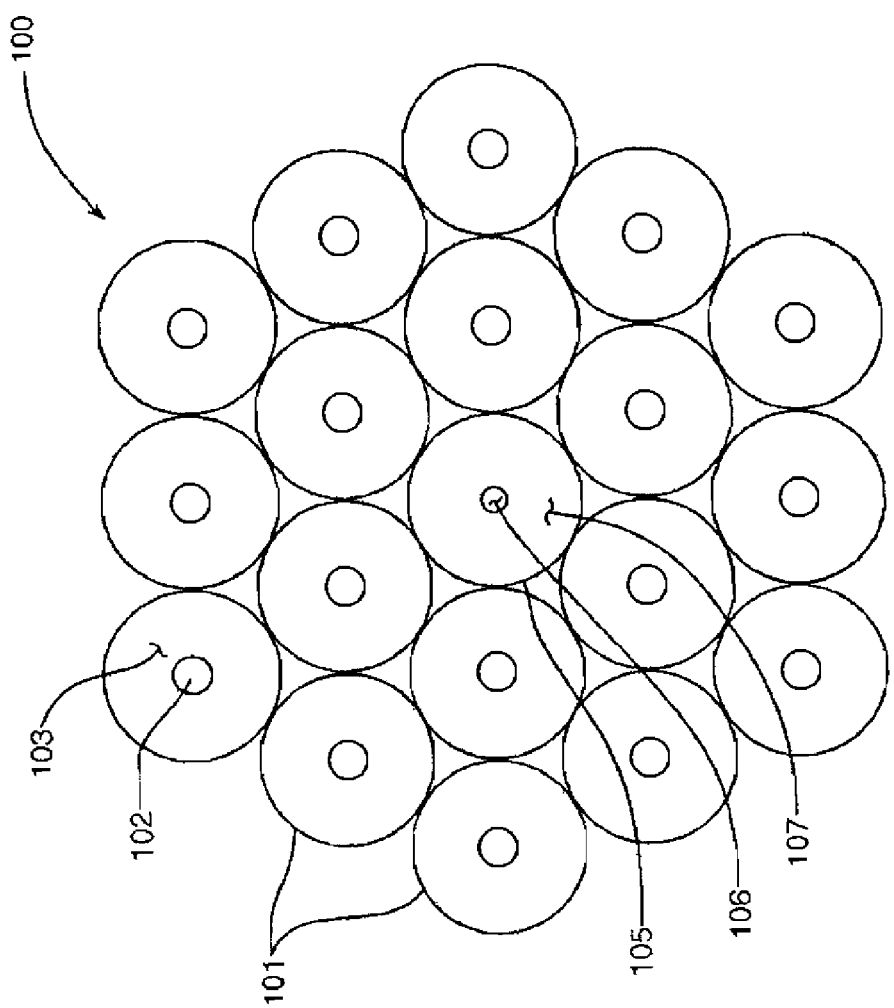
FIG. 1 is a cross-sectional view of a fiber bundle array.

As shown in FIG. 1, the first element of the device is a fiber bundle array 100. The fiber bundle array 100 consists of an array of close-packed fibers 101. The largest fill factor in such an array may be obtained by using a triangular-shaped lattice array. As shown in FIG. 1, a generally triangular-shaped lattice geometry is used. Other suitable geometries for the fiber bundle array 100 include generally rectangular- or square-shaped arrays, shown in FIG. 3. However, persons skilled in the art will appreciate that other lattice geometries may be used for the fiber bundle array 100. For example, the fiber bundle array 200 in FIG. 3 may be configured of more close-packed fibers 201 that may overlap (not shown).

The fiber bundle array 100 includes a plurality of outer fibers 101. The outer fibers 101 are referred to as probe fibers 101. Each probe fiber 101 has a core 102 and a cladding layer 103. A central pump fiber 105 is disposed at the center of the outer fibers 101 of the fiber bundle array 100. This central pump fiber 105 is referred to as a bundle pump fiber 105. The bundle pump fiber 105 has a core 106 and a cladding layer 107.

The core 106 of the bundle pump fiber 105 is smaller in diameter than the diameter of the core 102 of each of the probe fibers 105 in the fiber bundle array 100. The bundle pump fiber 105 guides a single transverse radiation mode at the operating wavelength. The smaller the core 106 of the bundle pump fiber 105 is made, the more uniform will be the pump field produced by the beam of the bundle pump fiber 105 within a non-linear medium. This is so because a smaller diameter pump beam expands more rapidly and thereby overlaps the beams of the probe fibers 101 of the fiber bundle array 100 in a non-linear medium. Increasing the numerical aperture of the core 106 of the bundle pump fiber 105 enables the use of a smaller size core 106 in the bundle pump fiber 105. The diameter of the core 106 of the bundle pump fiber 105 will depend on the operating wavelength of the beams of the other probe fibers 101. If the wavelengths of the beams of the probe fibers 101 are in the 1 micron range, the diameter of the core 106 of the bundle pump fiber 105 should be approximately 5 microns.

The diameter of the core 102 of each probe fiber 101 in the fiber bundle array 100 should be as large as possible while still maintaining single-transverse mode of operation. If the wavelengths of the beams of the probe fibers 101 are in the 1 micron range, the diameter of the core 102 of the probe fibers 101 should be in the 25 micron range. These dimensions generally scale linearly with wavelength.

Figure 3:
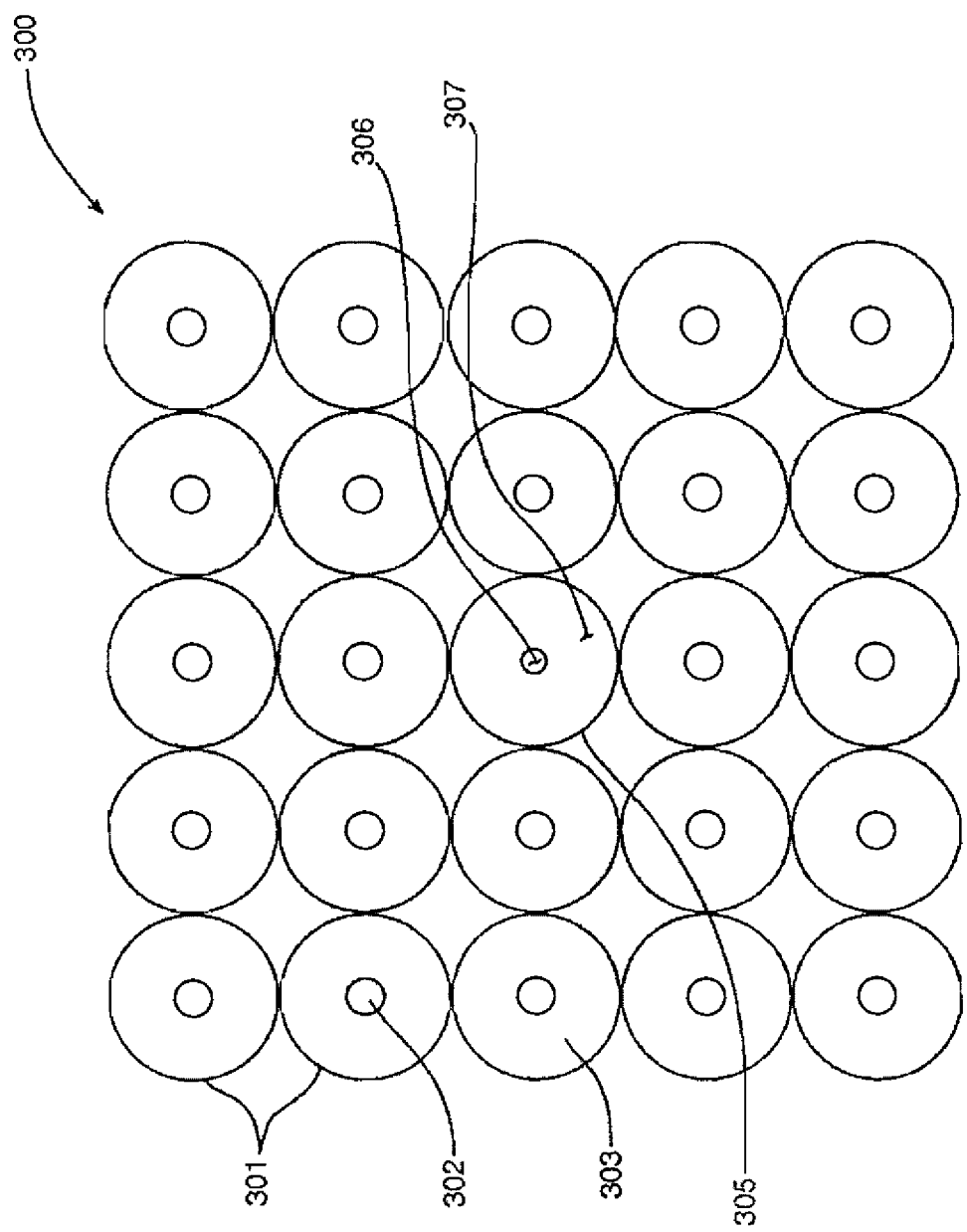
FIG. 3 is a cross-sectional view of another fiber bundle array.

As shown in FIG. 3, another configuration of fiber bundle array 300 includes a plurality of outer fibers 301, referred to as probe fibers 301. Each probe fiber 301 has a core 302 and a cladding layer 303. A central pump fiber 305 is disposed at the center of the outer fibers 301 of the fiber bundle array 300. The bundle pump fiber 305 has a core 306 and a cladding layer 307.

As with the previous embodiment, the core 306 of the bundle pump fiber 305 is smaller in diameter than the diameter of the core 302 of each of the probe fibers 305 in the fiber bundle array 300. The bundle pump fiber 305 guides a single transverse radiation mode at the operating wavelength. The smaller the core 306 of the bundle pump fiber 305 is made, the more uniform will be the pump field produced by the beam of the bundle pump fiber 305 within a non-linear medium. As with the previous embodiment, a smaller diameter pump beam expands more rapidly and thereby overlaps the beams of the probe fibers 301 of the fiber bundle array 300 in a non-linear medium. Increasing the numerical aperture of the core 306 of the bundle pump fiber 305 enables the use of a smaller size core 306 in the bundle pump fiber 305.

As with the previous embodiment, the diameter of the core 306 of the bundle pump fiber 305 will depend on the operating wavelength of the beams of the other probe fibers 301. If the wavelengths of the beams of the probe fibers 301 are in the 1 micron range, the diameter of the core 306 of the bundle pump fiber 305 should be approximately 5 microns. The diameter of the core 302 of each probe fiber 301 in the fiber bundle array 300 should be as large as possible while still maintaining single-transverse mode of operation. If the wavelengths of the beams of the probe fibers 301 are in the 1 micron range, the diameter of the core 302 of the probe fibers 301 should be in the 25 micron range. These dimensions generally scale linearly with wavelength.

Figure 2:
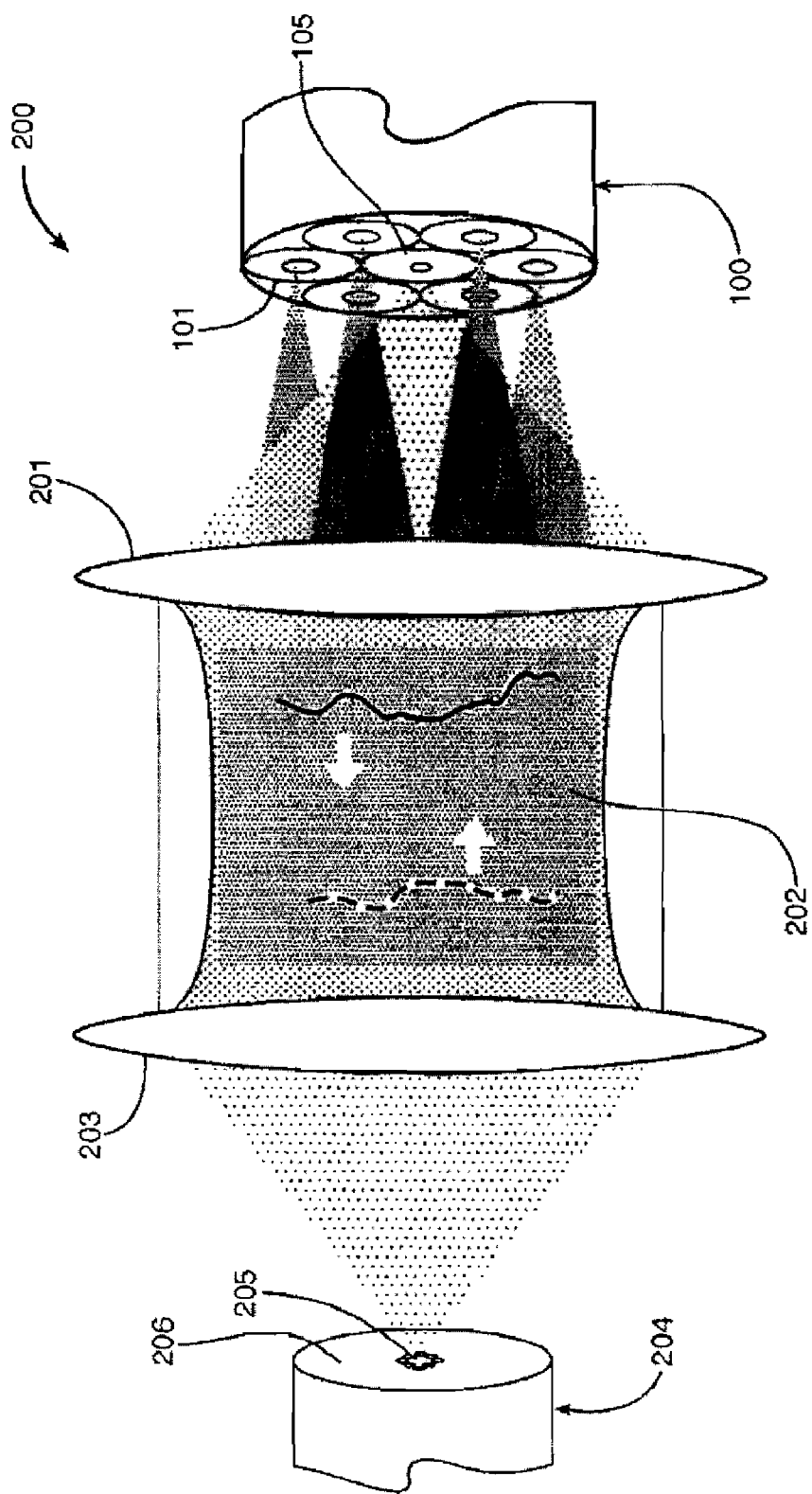
FIG. 2 is a side elevation of a fiber bundle phase conjugate mirror.

A phase conjugation mirror or device 200 according to the present disclosure is shown in FIG. 2. This device 200 provides phase conjugation of the beams from the probe fibers 101 in the following manner. Beams output from each of the probe fibers 101 of the fiber bundle array 100 are multiplexed with the beam of the bundle pump fiber 105. The smaller aperture core 106 of the bundle pump fiber 105 causes the beam of the bundle pump fiber 105 to expand faster than the beams of the probe fibers 101. As a result, the beam of the bundle pump fiber 105 overlaps the beams of the probe fibers 101 in the non-linear medium 202.

The optical output from the fiber bundle array 100 should then traverse a collimating lens 201, a non-linear medium 202, a focusing lens 203, and a pump collection fiber 204, as shown in FIG. 2. The focusing lens 203 is identical in configuration and composition as the collimating lens 201. The pump collection fiber 204 is identical in configuration and composition to the bundle pump fiber 105. The pump collection fiber 204 has a core 205 and a cladding layer 206. The core 205 of the pump collection fiber 204 has the same diameter and index of refraction as the core 106 of the bundle pump fiber 105.

The non-linear medium 202 is positioned so that it is centered on the waist of the beam of the bundle pump fiber 105. The non-linear material 202 may comprise any suitable material for the operating wavelength of the beams of the fiber bundle array 100 and should possess a strong third-order non-linearity to promote the four-wave mixing process. Examples of suitable materials for the non-linear medium 202 include photorefractive crystals, gasses, liquids, and laser crystals doped with ionic species active at the operating wavelength. In one embodiment, the non-linear medium 202 may comprise a Ytterbium and Erbium co-doped glass material.

To maximize the phase conjugation and output of the fiber bundle array 100, the fiber bundle 100, collimating lens 201, focusing lens 203, non-linear medium 202, and pump collection fiber 204 should be positioned so that the single-transverse mode output of the bundle pump fiber 105 is matched to the single-transverse mode output of the pump collection fiber 204. As discussed in more detail hereinafter, this can be accomplished by adjusting the orientation and position of the fiber bundle array 100 and the pump collection fiber 204 in relation to the collimating lens 201, the focusing lens 203, and the non-linear medium 202 to produce a standing wave in the non-linear medium 202 and maximum power output from the fiber bundle array 100. This also provides single mode fiber coupling.

By varying the adjustment and degrees of freedom of the fiber bundle array 100, pump collection fiber 204, collimating lens 201, and focusing lens 203, the distorted wavefront produced by the fiber bundle array 100 can be conjugated to a provide a unified wavefront wherein maximum power can be produced from the bundle array 100. At least seven degrees of freedom are provided in the fiber bundle array 100, pump collection fiber 204, collimating lens 201, focusing lens 203, and non-linear medium 202. The seven degrees of freedom include the distance between the collimating lens 201 and the focusing lens 203, the distance between the end of the fiber bundle array 100 and the collimating lens 201, the distance between the focusing lens 203 and the pump collection fiber 204, the horizontal and vertical displacement from the center of the fiber bundle array 100 relative to the center of the collimating lens 201, and the horizontal and vertical displacements of the pump collection fiber 204 from the center of the focusing lens 203. The combined function of these degrees of freedom is to provide efficient coupling of radiation from the core 106 of the center fiber 105 of the fiber bundle array 100 to the core 205 of the pump collection fiber 204, and from the core 205 of the pump collection fiber 204 to the core 106 of the center bundle pump fiber 105 of the fiber bundle array 100. Persons skilled in the art will understand that these degrees of freedom may be aligned and locked at a factory so that no additional adjustment is necessary for a field application, as is common with commercial laser systems. Alternatively, a device could be assembled with zero degrees of freedom with sub-micron dimensional tolerances. In either case, the seven degrees of freedom provide a means to efficiently and effectively couple radiation from the center fiber 105 with radiation of the pump collection fiber 205.

Figure 4:
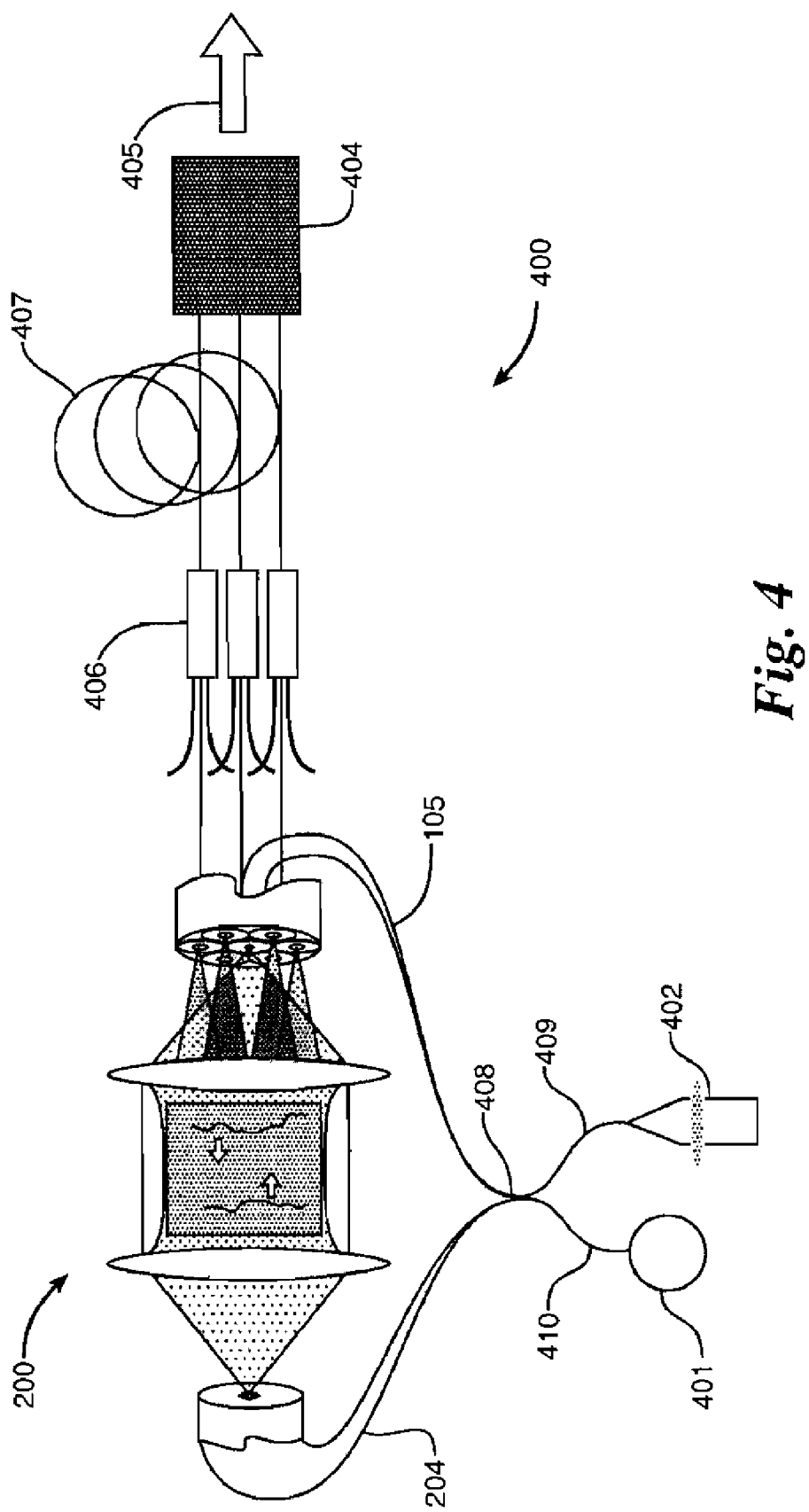
FIG. 4 is a laser with a fiber bundle phase conjugate mirror.

As adjustments to the various degrees of freedom are made, a power detector 401 measures the power output from the pump collection fiber 204. The power detector 401 may be positioned at a distal end of the pump collection fiber 204, as shown in FIG. 4, to measure the power transmitted through the pump collection fiber 204 and thereby determine when the maximum power level has been produced from the fiber bundle array 100. These adjustments are typically made before the high-power laser is turned on. Only the FWM pump laser 402 is employed for this alignment. When the system reaches maximum power output, this point generally corresponds to the creation or presence of a standing wave in the non-linear medium 202, and correspondingly to phase conjugation of the wave front produced by the radiation of the probe fibers 101 of the fiber bundle array 100.

By providing phase conjugation of the beams of the fiber bundle array 100 in the back end of a laser cavity, it can be ensured that the energy output from the laser at the business end of the probe fibers 101 and the fiber bundle array 100 has the same wavefront. The fully phase-conjugated wavefront passes through pump couplers 406 and active fiber 407 to the beam combiner 404 for high power laser output 405 from the laser 400. Such phase conjugation provides a high power laser output 405 from the beam combiner 404 at the front end of the laser 400. This facilitates high energy applications at the output end of the laser 400.

A main advantage and another novel feature of this disclosure and invention is the introduction of the four wave mixing pump beam via the central bundle pump fiber 105, 305 of the fiber bundle array 100, 300 and the use of a smaller core 106, 306 in the central bundle pump fiber 105, 305 to maximize pump uniformity and overlap in the non-linear medium 202. One method of accomplishing this is for the laser source that supplies the four wave mixing pump beam to be coupled to a fiber-optic coupler so that the four wave mixing pump beam is split into two equal-intensity beams via the coupler. One of the beams propagates outward through the bundle pump fiber 105, 305. The other beam propagates outward through the pump collection fiber 204. The overall intensity of the pump beams can be adjusted to maximize the phase conjugation efficiency of the device. The signal within each probe fiber 101 is then coupled to the fiber laser array through splicing or other means.

As shown in FIG. 4, this can be accomplished by using a 50/50 fiber splitter 408. In this embodiment, the fibers 409 traveling from the FWM pump laser 402 and the fibers 410 traveling from the power detector 401 pass closely together so that they are in fact fused together to form a 50/50 splitter 408. Such 50/50 fiber splitters are a common commercial product. The use of the 50/50 splitter 408 enables half of the pump power from the FWM pump laser 402 to be sent in each direction through the non-linear medium 200. Half of the pump power from the FWM pump laser 402 passes from the 50/50 splitter 408 and passes through the pump collection fiber 204 to the non-linear medium 200, while the other half of the power from the FWM pump laser 402 passes from the 50/50 splitter 408 and passes through the bundle pump fiber 105 to the non-linear medium 200. Persons skilled in the art will appreciate that there are other ways to split the four wave mixing pump beam and send it to the non-linear medium.

Alternative modes of practicing the inventions disclosed herein include the use of different non-linear materials, operation at wavelengths from the visible to the infra-red, use of different numbers of fibers in the fiber bundle array, corresponding to elements in the fiber laser array, the use of birefringent fibers in the array to enhance the four-wave mixing efficiency, use of an active nonlinear medium for example by pumping laser crystals in order to make use of non-linear gain saturation to obtain the required non-linearity.

Another embodiment can be obtained by splicing the non-linear material, if it is comprised of a suitable material, directly onto the fiber bundle array. In this case, all of the collimation and focusing optics for the pump beams are adjacent to the pump collection fiber.

The foregoing disclosure has been presented for purposes of illustration and description and is not intended to be exhaustive or to limit the invention to the various embodiments and forms disclosed herein. Persons skilled in the art will realize and appreciate that many modifications and variations are possible in light of the above teaching. The disclosed embodiments were chosen and described to best explain the principles of the invention and its practical application to thereby enable others skilled in the art to best use the invention in various embodiments and with various modifications suited to the particular use contemplated. The scope of the invention is to be defined by the following claims.

What is claimed is:

1. A method for passively conjugating a distorted wavefront, comprising the steps of:
    multiplexing a plurality of probe fibers and a bundle pump fiber in a fiber bundle array;
    passing the multiplexed output from the fiber bundle array through a collimating lens and into one portion of a non-linear medium;
    passing the output from a pump collection fiber through a focusing lens and into another portion of the non-linear medium so that the output from the pump collection fiber mixes with the multiplexed output from the fiber bundle;
    adjusting one or more degrees of freedom of one or more of the fiber bundle array, the collimating lens, the focusing lens, the non-linear medium, or the pump collection fiber to produce a standing wave in the non-linear medium.

2. The method of claim 1, wherein the power output from the fiber bundle array is maximized by detecting power in the pump collection fiber and adjusting one or more of the degrees of freedom to maximise the power output.

3. The method of claim 1, further comprising the step of measuring the power output from the fiber bundle array and adjusting the one or more of the degrees of freedom of the fiber bundle array, the collimating lens, the focusing lens, the non-linear medium, and/or the pump collection fiber to maximize power output from the fiber bundle array.

4. The method of claim 1, wherein the step of multiplexing the plurality of probe fibers and the bundle pump fiber in the fiber bundle array comprises the step of feeding a pump signal through a core of the bundle pump fiber, wherein the core of the bundle pump fiber is smaller in diameter than the diameter of the cores of each of the probe fibers.

5. The method of claim 1, wherein the pump collection fiber is identical or substantially identical in configuration and composition to the bundle pump fiber.

6. The method of claim 1, further comprising the steps of producing a phase conjugated wavefront and combining the phase conjugated wavefront into a high power output from a laser.

7. The method of claim 1, wherein a return signal in each probe fiber is in phase at an opposite end of the fiber array to produce a single phase locked beam.

8. The method of claim 1, further comprising the step of transmitting a single transverse radiation mode at the operating wavelength through the bundle pump fiber.

9. The method of claim 1, further comprising the step of transmitting counter-propagating pump beams through the bundle pump fiber and the pump collection fiber and focusing the beams into the non-linear medium so that their combined intensity is uniform in the region of overlap with the fiber bundle array output.

10. An apparatus for passively conjugating the phases of a fiber bundle array, comprising:
    a fiber bundle array that includes a plurality of probe fibers and a bundle pump fiber;
    a collimating lens disposed substantially adjacent to the fiber bundle array;
    a non-linear medium disposed adjacent to the collimating lens;
    a focusing lens disposed adjacent to the non-linear medium; and
    a pump collection fiber disposed substantially adjacent to the focusing lens,
    wherein one or more degrees of freedom of said fiber bundle array, said collimating lens, said focusing lens, and said pump collection fiber can be adjusted so that beams emitted from said probe fibers and said bundle pump fiber pass through said collimating lens and said non-linear medium and engage a beam emitted from said pump collection fiber to produce a standing wave in said non-linear medium.

11. The apparatus of claim 10, wherein the bundle pump fiber is disposed at a center of the fiber bundle array and a pump signal is fed through the bundle pump fiber.

12. The apparatus of claim 10, wherein the bundle pump fiber and the pump collection fiber have the same composition and configuration and the fiber bundle array may be generally triangular-shaped or generally rectangular-shaped.

13. The apparatus of claim 10, wherein the core of the bundle pump fiber is smaller in diameter than the diameter of the core of each of the probe fibers.

14. The apparatus of claim 10, wherein the bundle pump fiber guides a single transverse radiation mode at the operating wavelength.

15. The apparatus of claim 10, wherein the degrees of freedom that may be adjusted on the apparatus include a distance between the collimating lens and the focusing lens, a distance between the end of the fiber bundle array and the collimating lens, a distance between the focusing lens and the pump collection fiber, a horizontal and vertical displacement from the center of the fiber bundle array relative to a center of the collimating lens, and horizontal and vertical displacements of the pump collection fiber from the center of the focusing lens.

16. The apparatus of claim 10, further comprising a fiber optic coupler that splits a four wave mixing pump beam into two equal-intensity beams, wherein one of the beams propagates through the bundle pump fiber and the other beam propagates through the pump collection fiber to produce counter-propagating pump beams that are focused into the non-linear medium so that their combined intensity is uniform in the region of overlap with the fiber bundle array output.

17. The apparatus of claim 10, wherein the non-linear medium is positioned so that it is centered on a beam output from the bundle pump fiber.

18. The apparatus of claim 10, wherein the degrees of freedom of one or more of the bundle pump fiber, the collimating lens, the focusing lens, the non-linear medium, and the pump collection fiber are adjusted so that a single-transverse mode output of the bundle pump fiber is matched to a single-transverse mode output of the pump collection fiber.

19. The apparatus of claim 18, wherein a standing wave is produced in the non-linear medium and maximum power is output from the fiber bundle array.

20. The apparatus of claim 10, wherein four-wave mixing is maximized and phase conjugation efficiency is greatly improved so that a uniform wavefront of maximum or near maximum power may be output from a distal end of the fiber bundle array at the front end of the laser.

21. The apparatus of claim 10, wherein the non-linear medium comprises photorefractive crystals, gasses, liquids, or laser crystals doped with ionic species active at the operating wavelength.

22. The apparatus of claim 10, further comprising a power sensing device that is positioned at a distal portion of the pump collection fiber away from the non-linear medium to measure the power output of the pump collection fiber.

23. The apparatus of claim 10, wherein the composition and configuration of the collimating lens and the focusing lens are the same or substantially the same.

* * * * *